June 29, 1965
D. S. DOUGAN ETAL
3,191,489
APPARATUS FOR PHOTOGRAPHICALLY MODIFYING
ONE DIMENSION OF REPRODUCEABLE DATA
Filed Nov. 22, 1961
2 Sheets-Sheet 1
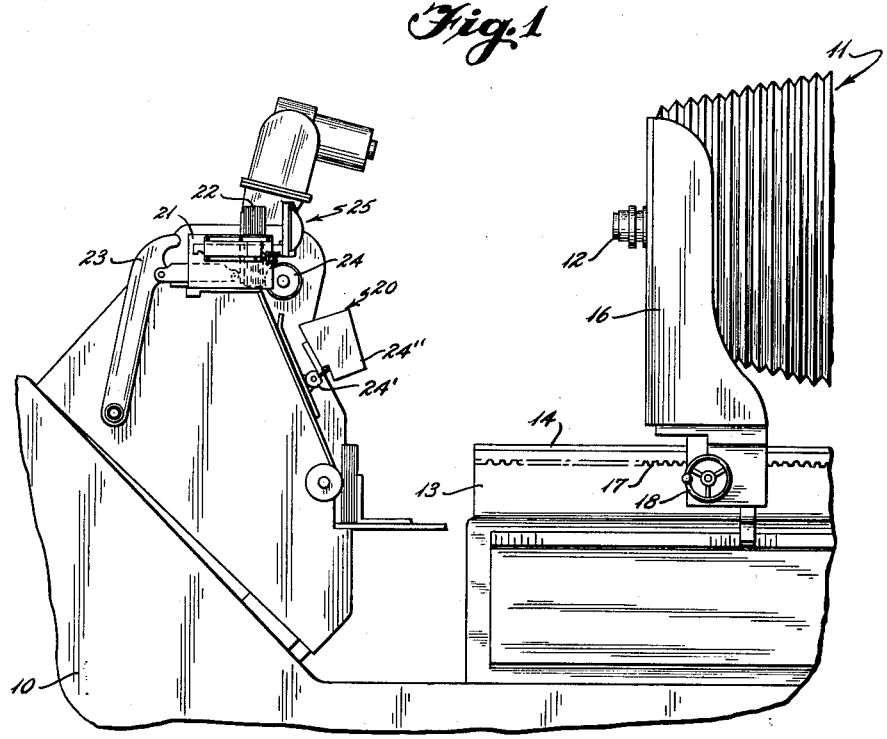
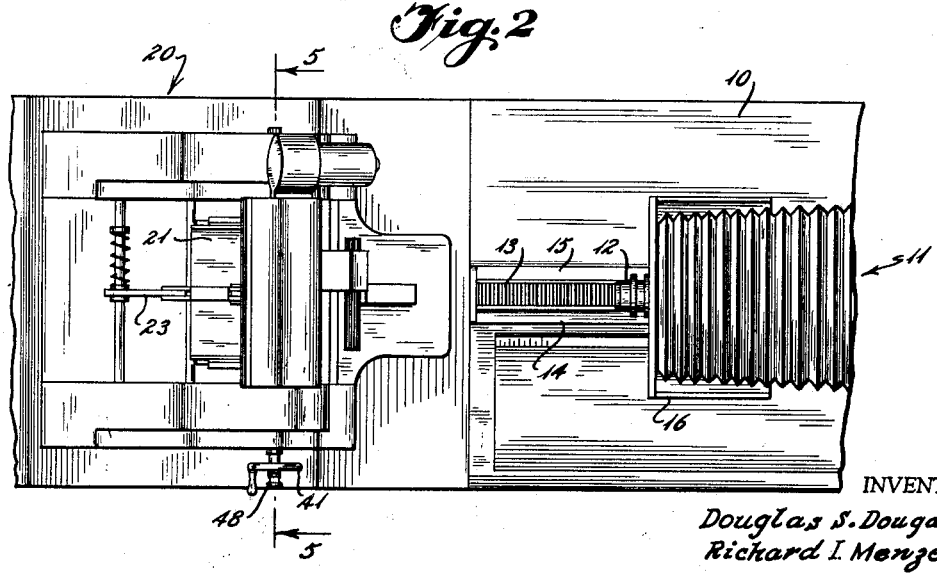
INVENTORS
Douglas S. Dougan
Richard I. Menzel
BY
ATTORNEY

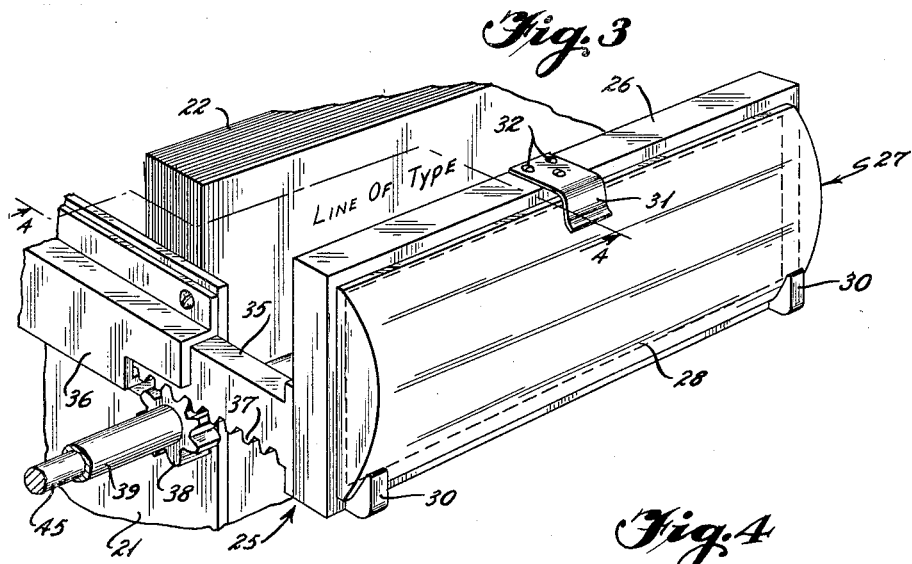
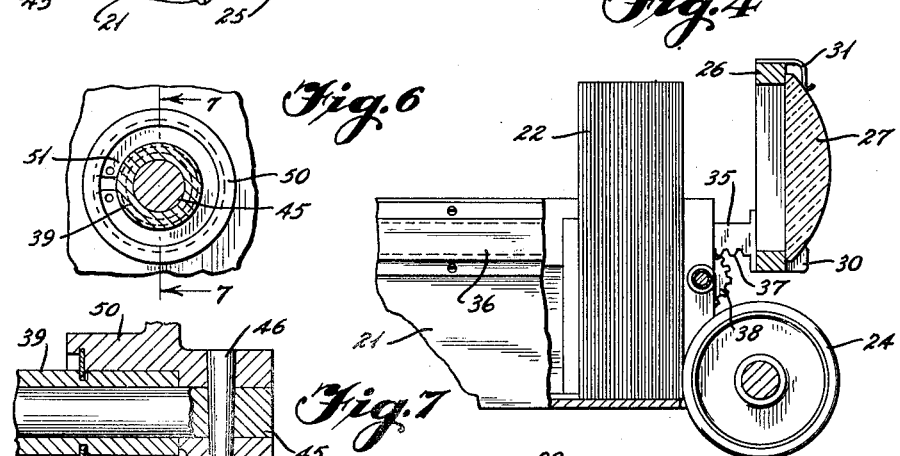
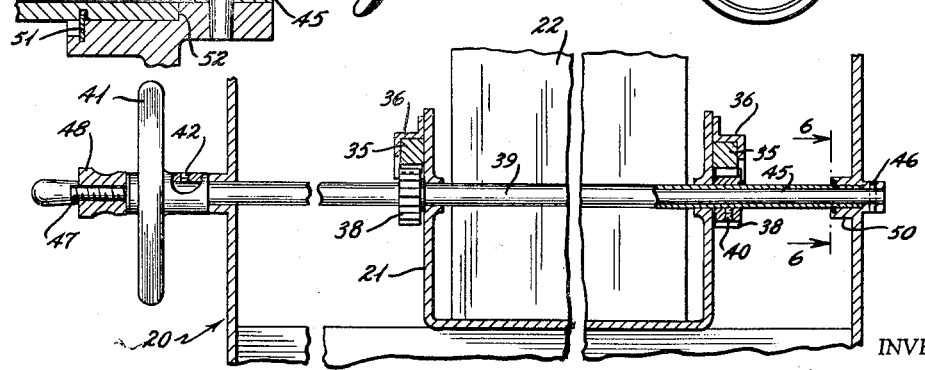

3,191,489
APPARATUS FOR PHOTOGRAPHICALLY MODIFYING ONE DIMENSION OF REPRODUCEABLE DATA
Douglas S. Dougan, Bernardsville, and Richard I. Menzel, Cranford, N.J., assignors to Lithoid, Inc., New Brunswick, N.J.
Filed Nov. 22, 1961, Ser. No. 154,210
3 Claims. (Cl. 88—24)

This invention relates to the reproduction of printed matter or the like data onto a photographic medium from which it can be transferred onto a printing plate for utilizing such data in the making of multiple impressions or reproductions.

This invention relates particularly to a lens system for use with a camera and to the equipment of the system by which the data to be transferred may be modified to increase or decrease the vertical dimension thereof while maintaining the horizontal dimension constant.

This invention is an improvement over copending application 794,437 for a "Machine for Photographically Reproducing Data" which utilizes a lens system to enlarge, reduce or maintain the physical size of the data during the reproduction process, but which cannot modify one dimension without modification of the other.

It is an object of the invention to provide a lens system for use with a camera in the photographic reproduction of data and in which such lens system is capable of modifying the physical dimensions of such data in one direction without modifying such physical dimensions in another direction.

Another object of the invention is to provide a lens system for use with a camera in the photographic reproduction of data in which the lens is adjustable relative to the data so that the physical dimensions of such data may be adjustably modified in one direction without modification in another direction.

A further object of the invention is to provide a lens holder in which a selected lens may be easily and quickly mounted and removed.

Other objects and advantages of the invention will be apparent from the following description taken in conjunction with the accompanying drawing wherein:

FIG. 1 is a side elevation, with portions broken away, of a machine for photographically reproducing data and illustrating one application of the invention;

FIG. 2, a top plan view thereof;

FIG. 3, an enlarged fragmentary perspective of the structure of the present invention;

FIG. 4, a section on the line 4—4 of FIG. 3;

FIG. 5, an enlarged section on the line 5—5 of FIG. 2;

FIG. 6, an enlarged section on the line 6—6 of FIG. 5; and

FIG. 7, a section on the line 7—7 of FIG. 6.

Briefly stated, the present invention comprises a lens system for use with a camera in the photographic reproduction of data and includes an adjustable camera, a plurality of data bearing cards, a card feeding machine and means on the card feeding machine for operating the shutter and film feed system of the camera. The lens system includes a lens holder adapted to receive an optical lens which modifies an image in one direction only. The lens holder is adjustably mounted on the card feeding machine for altering the amount of modification.

With continued reference to the drawings, the present invention includes a base 10 on which a camera 11 having an electrically operated shutter 12 is adjustably mounted on a camera bed 13.

The camera bed 13 provides a support for a pair of rails 14 and 15 on which a shutter support 16 is slidably mounted. A rack 17 depends from the outer edge of the rail 14 and such rack is engaged by a pinion which can be rotated by a hand wheel 18 to change the adjustment of the shutter 12 relative to the film (not shown) onto which data is being transferred.

The camera 11 preferably is of the bellows type which permits the image of the data being transferred to be enlarged or reduced according to the position of the shutter relative to the position of the film.

Card feeding mechanism 20 is mounted on the base 10 in spaced relation to the camera bed 13 and such card feeding mechanism is provided with a magazine 21 in which a series of data bearing cards 22 are adapted to be received.

The cards 22 constitute a deck and the majority of these cards have predetermined data imprinted or otherwise provided thereon although several blank cards may be placed at the front and at the rear of the deck to create a space at the top and the bottom of the page to be printed.

The first card of the deck is located in a predetermined position and as the cards are fed through the machine one by one each card is advanced to such predetermined position by a conventional spring-loaded mechanism 23. When the card feeding mechanism 20 is started, the first card is removed from the deck by a friction cam 24 and allowed to pass downwardly by gravity whereupon it trips a switch 24' to operate the shutter of the camera and then operates a second switch 24" to advance the photographic film in any desired manner.

It is desirable at times to modify the size of the data being transferred in one direction while maintaining a fixed dimension in the other direction. In order to do this, a dioptic lens system 25 is provided comprising a holder 26 of hollow generally rectangular configuration adapted to receive an elongated lens 27 which covers the front face of the holder 26. The lens 27 may have a convex surface 28 which extends from end to end thereof as illustrated in FIGS. 3 and 4 to increase the vertical dimension of the data while maintaining the horizontal dimension constant or such lens may have a concave surface to decrease the vertical dimension of the data while maintaining the horizontal dimension constant.

The invention is susceptible of various adjustments in order to obtain the desired results. For example, the camera can be adjusted in cooperation with the lens system to increase or decrease the overall size of the data being transferred so that a greater or lesser amount of data can be placed in a given area without impairing the reading quality.

The lens 27 is removably mounted in a pair of brackets 30, one at each side, on the front face of the holder 26 and is held in fixed position against the holder 26 by a spring clip 31 attached centrally of the upper portion of the holder by fasteners 32.

The holder 26 is mounted on a pair of arms 35 connected at right angles to the rear face of the holder 26 at each side thereof. The arms 35 are slidably received within guides 36 attached to each side of the magazine 21. In order to adjust the amount of modification of the data, the arms 35 are provided with racks 37 along their lower edges and such racks engage pinions 38 fixed to a sleeve 39 by set screws 40. A hand wheel 41 is fixed to one end of the sleeve 39 by a set screw 42 and rotation of such hand wheel rotates the pinions 38 to move the lens 27 relative to the data bearing cards 22.

The sleeve 39 is rotatably mounted on a shaft 45 fixed to one side of the card feeding mechanism 20 by a pin 46. The opposite end of the shaft 45 is provided with threads 47 on which a lock nut 48 is threadedly received.

The opposite end of the sleeve 39 is rotatably received within a boss 50 on the card feeding mechanism 20 and is retained therein by a spring clip 51 (FIGS. 6 and 7).

In order to fix the sleeve 39 in adjusted position, the lock nut 48 is rotated against one end of the sleeve until the opposite end of such sleeve binds against a shoulder 52 within the boss 50.

In the use of the device, the lens 27 is interposed between the data bearing cards 22 and the shutter 12 of the camera to modify the image being projected onto the photographic film. This is desirable in order to reduce or enlarge the overall length of the data carried by the cards. For example, if it is desired to decrease the overall length of the data while maintaining the data in readable condition, a lens having a convex surface is positioned within the holder to increase the vertical dimension of the data after which the camera can be adjusted to reduce the image being projected onto the film. In this manner the length of the data will be reduced and the vertical dimension of such data will remain substantially the same as the original.

It will be apparent that an infinite number of modifications can be made by moving the lens 27 toward and from the data bearing cards and moving the shutter 12 toward and from the photographic film.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for the reproduction of printed matter onto a photographic medium and for modifying one dimension of the data transferred without modifying the other dimension thereof comprising
    (1) a base 10,
    (2) card handling mechanism 20 mounted on said base for receiving data bearing cards,
        (a) guides 36 attached at opposite sides of said card handling mechanism,
            means for moving said cards through said card-handling mechanism one at a time,
    (3) photographic mechanism 11 mounted on said base,
        (a) said photographic mechanism 11 being adjustable relative to said card handling mechanism 20,
    (4) trigger means 24', 24" for actuating said photographic mechanism 11 when each of said cards engages the same,
    (5) a lens system 25 interposed between said photographic mechanism 11 and said card handling mechanism 20,
        (a) said lens system 25 including a curved lens 27,
        (b) a holder 26 detachably mounting said lens,
            (1) a pair of parallel rack-forming arms 35 mounting said holder,
                (a) said arms 35 being disposed at opposite sides of said card handling mechanism,
                (b) said arms 35 being slidably received within said guides 36,
    (6) spaced pinions 38 engaging said parallel rack forming arms 35,
        (a) a sleeve 39 mounting said pinions in fixed relation,
            (1) an operating member for rotating said sleeve 39,
        (2) a shaft 45 anchored at one end and extending through said sleeve 39 and having its other end threaded 47 and
        (3) a nut on said threaded end for securing said shaft and sleeve in fixed relation.

2. Apparatus for reproducing printed matter onto a photographic medium comprising a base, a card-handling mechanism mounted on said base, a plurality of data-bearing cards carried by said card-handling mechanism, means for moving said cards one at a time to a predetermined position on said card-handling mechanism, means for removing said cards from said predetermined position, a photographic mechanism mounted on said base in spaced relation to said card-handling mechanism and in alignment with said predetermined position, said photographic mechanism including a shutter, a film and a film feed, a first trigger means mounted on said card-handling mechanism for operating said shutter, a second trigger means mounted on said card-handling mechanism for operating said film feed, said first and second trigger means being operated sequentially by a card after it is removed from said predetermined position, a dioptic lens system mounted on said card-handling mechanism in spaced relation to said cards and between said cards and said shutter, said lens system including a lens having a surface curved about a horizontal axis and extending from side to side thereof to modify the vertical dimension only of the data carried by said cards, and means for moving said lens toward and from said cards, whereby the dimensions of the data transferred from the cards to the photographic film can be modified in one direction.

3. Apparatus for the reproduction of printed matter onto a photographic medium comprising a base, a card handling mechanism mounted on said base, a plurality of data bearing cards carried by said card handling mechanism, a photographic mechanism mounted on said base in spaced relation to said card handling mechanism, said photographic mechanism being adjustable relative to said card handling mechanism, trigger means mounted on said card handling mechanism and adapted to be operated by the passage of said cards through said card handling mechanism, means connecting said trigger means with said photographic mechanism for operating said mechanism when each of said cards engages said trigger means in spaced relation with said cards, said lens system including a lens having a surface curved about a horizontal axis and extending from end to end thereof to modify the vertical dimension only of the data carried by said cards, means for selectively moving said lens toward and from said cards, and means for locking said lens in adjusted position, whereby the dimensions of the data transferred from the cards to the photographic mechanism can be modified in one direction.

References Cited by the Examiner

UNITED STATES PATENTS

| | | | |
|---|---|---|---|
| 2,084,450 | 6/37 | Paris | 88—24 X |
| 2,606,478 | 8/52 | Pratt et al. | 88—24 |
| 2,849,916 | 9/58 | Nolan | 88—24 |
| 2,968,992 | 1/61 | Billet | 88—24 |

NORTON ANSHER, *Primary Examiner.*

EMIL G. ANDERSON, *Examiner.*